United States Patent
Chou et al.

(10) Patent No.: US 7,848,277 B2
(45) Date of Patent: Dec. 7, 2010

(54) POWER MANAGEMENT METHODS AND SYSTEMS

(75) Inventors: Zi-Tsan Chou, Taipei (TW); Ching-Chi Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 1024 days.

(21) Appl. No.: 11/359,539

(22) Filed: Feb. 23, 2006

(65) Prior Publication Data

US 2007/0129093 A1 Jun. 7, 2007

(30) Foreign Application Priority Data

Dec. 5, 2005 (TW) .............................. 94142800 A

(51) Int. Cl.
*H04B 7/185* (2006.01)
(52) U.S. Cl. .................. 370/318; 370/449; 370/346; 455/13.3; 455/574; 455/522; 455/41.2
(58) Field of Classification Search ............... 455/13.3, 455/574, 522, 41.2; 370/449, 346, 318
See application file for complete search history.

(56) References Cited

U.S. PATENT DOCUMENTS

| 7,420,942 B2 * | 9/2008 | Wang .......................... 370/329 |
| 2006/0187864 A1 * | 8/2006 | Wang et al. ................. 370/311 |
| 2009/0097464 A1 * | 4/2009 | Sakoda ....................... 370/338 |

* cited by examiner

*Primary Examiner*—Lester Kincaid
*Assistant Examiner*—Mehmood B Khan
(74) *Attorney, Agent, or Firm*—Birch, Stewart, Kolasch & Birch, LLP

(57) ABSTRACT

Power management methods and systems for a first station and a second station in an ad-hoc network. Each station enters the normal beacon interval (NBI) every certain number of beacon intervals (BIs) for data transmission, a Listen Interval (LI). When a station switches to a power-saving mode, it first determines the number of "beacon-window-only beacon intervals (BBIs)" within a LI. In addition, each station broadcasts a beacon frame comprising at least information about "the remaining number of BIs (RBI)" within a beacon window. Once the first station correctly receives the beacon frame from the second station, the first station predicts the NBI of the second station according to the RBI. At the NBI of the second station, the first station transmits data frames to the second station.

12 Claims, 10 Drawing Sheets

POWER MANAGEMENT METHODS AND SYSTEMS

BACKGROUND OF THE INVENTION

1. Field of the Invention

The present disclosure relates generally to medium access control with power management methods and systems, and, more particularly to methods and systems for use in an ad hoc wireless network, where stations can transmit data accurately when operating in the power saving mode.

2. Description of the Related Art

Currently, the IEEE 802.11 is the most popular international medium access control (MAC) standard for WLANs (Wireless Local Area Networks). Based on the network architecture, wireless networks can be approximately divided two classes: infrastructure WLANs and ad hoc networks. FIG. 1 is a schematic diagram illustrating an ad hoc network. As shown in FIG. 1, each station (110, 120, 130, 140 and 150) can dynamically communicate with adjacent stations for data transmissions.

FIG. 2 is a schematic diagram illustrating a power consumption model for a general wireless network interface card (or adapter). Each station can stay in one of the transmission, reception, listen, or doze states. As shown in FIG. 2, the power consumption is approximately between 1.6 W to 1.2 W when the station stays in either the transmission, reception, or listen states, but is close to zero when staying in the doze state. In IEEE 802.11 power management for ad hoc networks, time is divided into fixed-sized BIs (Beacon Intervals), each of which contains an ATIM (Announcement Traffic Indication Message) window. Each station in a power saving mode (or called "power-saving station) must wake up at the beginning of each BI and remain awake in the ATIM window, awaiting the ATIM frame from other stations. If no ATIM frame is received in the ATIM window, then that station may enter the doze state after the ATIM window ends. If an ATIM frame is received in the ATIM window, then the station should reply the ATIM ACK (Acknowledgement) to the station transmitting the ATIM frame, and remains awake after the ATIM window ends. After the end of the ATIM window, the station which sending ATIM frames should use the DCF (distributed coordination function) procedure to transmit the buffered data frames to its intended destination, and the destination should acknowledge its receipt. For a more detailed presentation, please refer to IEEE 802.11 specification.

FIG. 3 is a schematic diagram illustrating an example of power management in an ad hoc network based on IEEE 802.11. As shown in FIG. 3, when a BI 1 begins (the timing is referred to as TBTT (Target Beacon Transmission Time)), stations X and Y compete to transmit a beacon frame for timing synchronization. It is understood that, in the example of FIG. 3, station X transmits a beacon frame for timing synchronization between stations comprising station X in the network. Since no ATIM frame is received in the ATIM window (AW for short), both stations X and Y enter the doze state (S) after the AW ends. BI 2 begins, and station X successfully transmits a beacon frame. Since station X receives an ATIM frame A from station Y in the AW of BI 2, station X returns a ATIM ACK a to station Y, and remains awake after the AW ends. After the AW ends, station Y can transmit a data frame D to station X, and station X returns a data ACK d to station Y after receiving the data frame D.

As described, in IEEE 802.11, each station in power saving mode must wake up in the ATIM window of "every" BI even if its battery power is low or there is no traffic for it. Hence we hope that each a power saving station can dynamically tune its listen interval (the number of BIs between two adjoining AWs) according to the remaining battery power status or other QoS considerations. Obviously, the value of LI is fixed at "one" in IEEE 802.11. In the invention, the LI of a power saving station can be adjusted according to parameters of quality of service or the remaining power of the station, substantially reducing power consumption on station.

BRIEF SUMMARY OF THE INVENTION

Power management methods and systems are provided.

In an embodiment of a power management method for use in a first station and a second station, three kinds of BIs comprising NBIs (Normal Beacon Intervals), BBIs (Beacon-Window-Only Beacon Intervals), and SBIs (Sleep Beacon Intervals) are provided if the first and second stations stay in a power saving mode. The first and second stations enter the NBI every certain number of BIs for data transmission, where the certain number of BIs is LI. First, the first and second stations respectively determine a number of BBIs within LI. Each station broadcasts a beacon frame comprising work information within a beacon window if the station stays in the BBI, in which the work information comprises a RBI (the remaining number of BIs) between the BBI where the beacon frame is transmitted and the NBI. After the beacon window ends, the station enters a doze state. Once the first station correctly receives the beacon frame from the second station, the first station predicts the NBI of the second station according to the RBI in the work information, and transmits data frames to the second station at the NBI of the second station based on the IEEE 802.11.

An embodiment of a power management system comprises an ad hoc network comprising a first station and a second station. The first and second stations enter a NBI every certain number of BIs for data transmission, where the certain number is LI. The first and second stations respectively determine a number of BBIs within the certain number of BIs, and broadcast a beacon frame within a beacon window of the BBI, in which the beacon frame comprises a RBI. Once the first station correctly receives the beacon frame from the second station, the first station predicts the NBI of the second station according to the RBI in the work information, and transmits data frames to the second station at the NBI of the second station.

In an embodiment of a power management method for use in a first station and a second station in an ad hoc network, in which the first and second stations enter a NBI for data transmission every a certain number of BIs, where the certain number is a LI value, the first and second stations respectively determine a number of BBIs within the certain number of BIs, and broadcast a beacon frame within a beacon window of the BBI, in which the beacon frame comprises a RBI representing the remaining number of BIs between the BBI where the beacon frame is transmitted and the NBI. Once the first station correctly receives the beacon frame from the second station, the first station predicts the NBI of the second station according to the RBI, and transmits a data frame to the second station at the NBI of the second station.

Power management methods and systems may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Power management methods and systems are provided.

Figure 1:
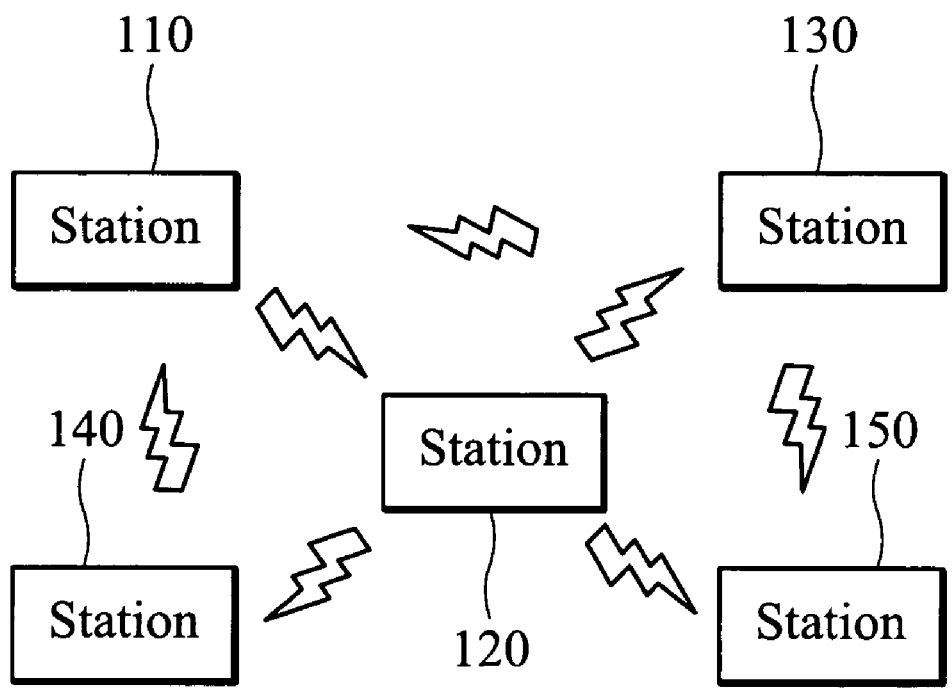
FIG. 1 is a schematic diagram illustrating an ad hoc network.
Figure 2:
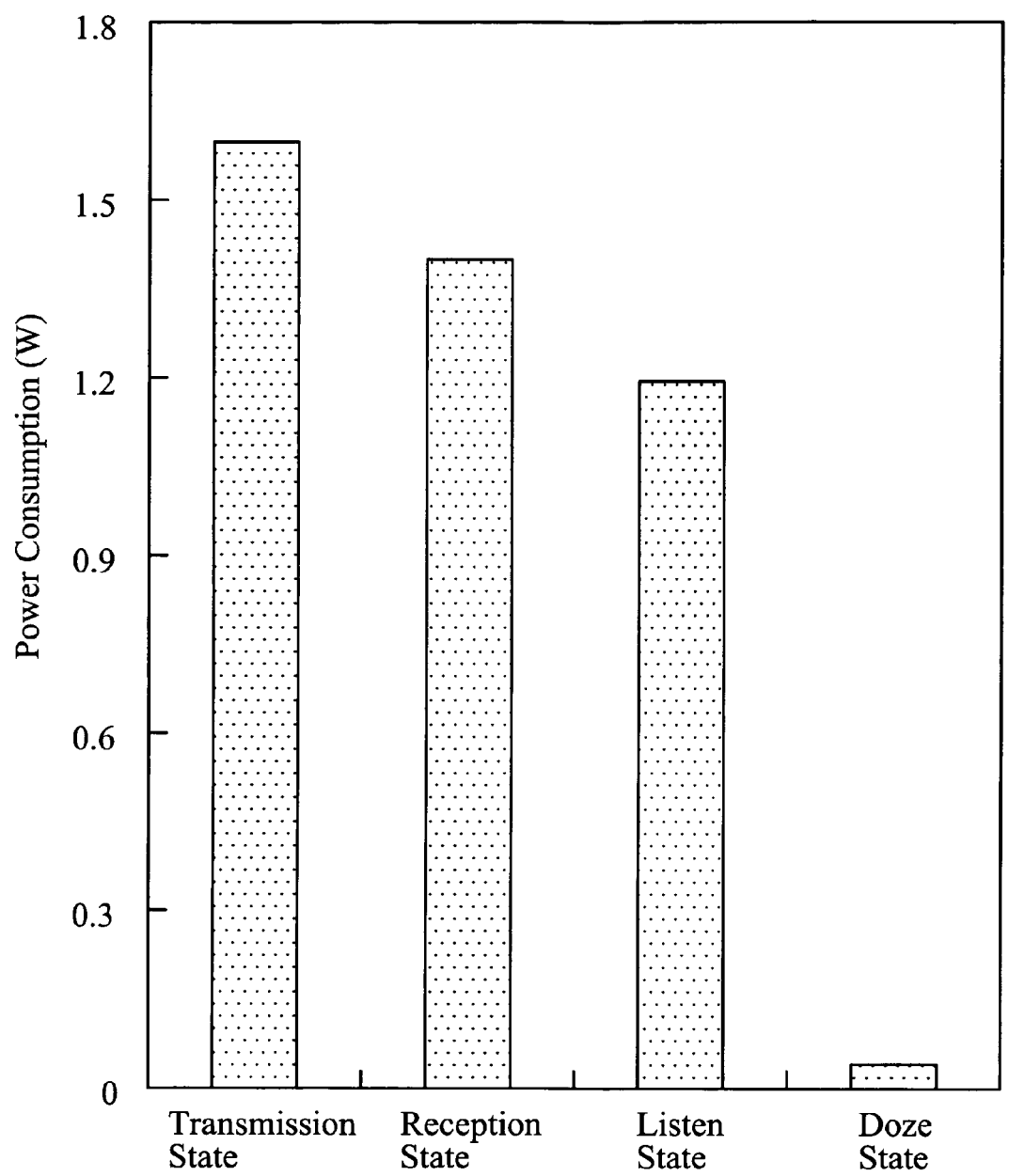
FIG. 2 is a schematic diagram illustrating a power consumption model of a general wireless network adapter.
Figure 3:
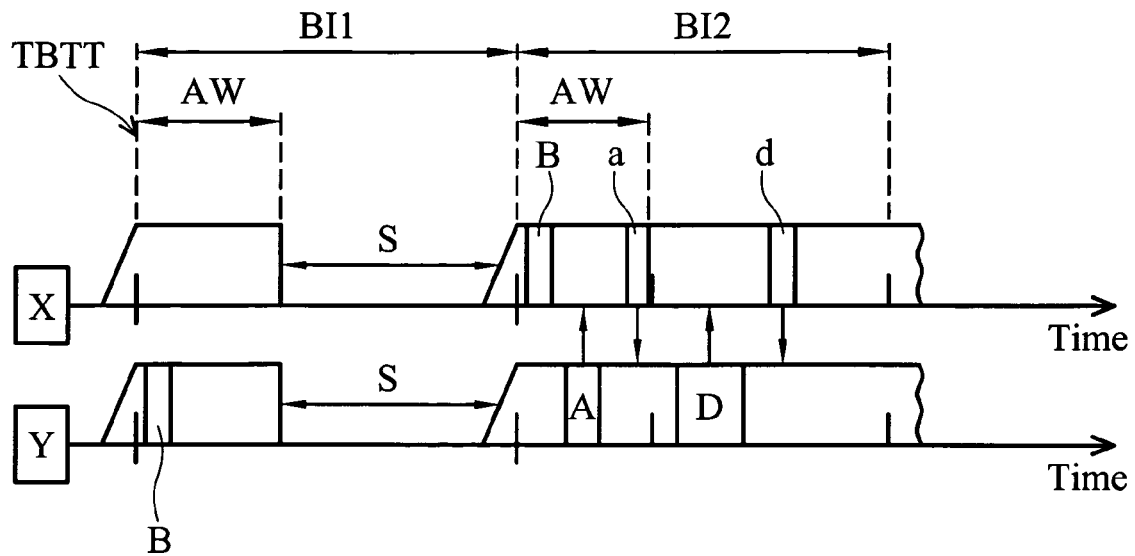
FIG. 3 is a schematic diagram illustrating an example of power management in an ad hoc network based on IEEE 802.11.
Figure 4:
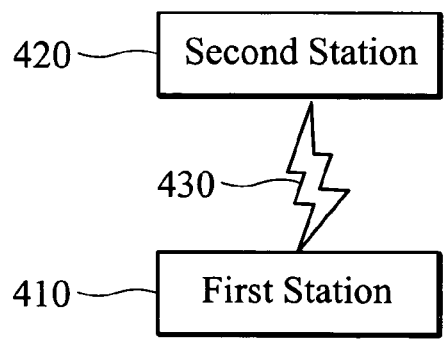
FIG. 4 is a schematic diagram illustrating an embodiment of a power management system.

FIG. 4 is a schematic diagram illustrating an embodiment of a power management system. As shown in FIG. 4, the power management system 400 comprises an ad hoc network comprising at least a first station 410 and a second station 420. The first station 410 and the second station 420 can be devices with wireless communication capability, such as computers, PDAs, mobile phones, and smart phones, but are not limited thereto. The first station 410 and the second station 420 can communicate with each other using radio waves 430.

In the invention, the BI comprises NBIs (Normal Beacon Intervals), BBIs (Beacon-Window-Only Beacon Intervals), and SBIs (Sleep Beacon Intervals).

Figure 5:
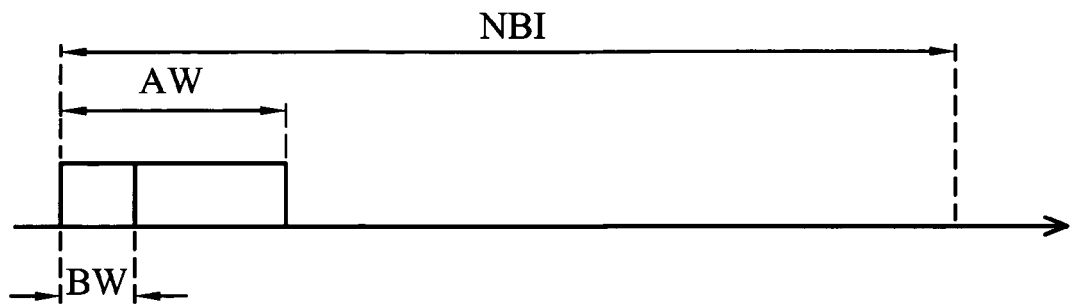
FIG. 5 is a schematic diagram illustrating an embodiment of a NBI.
Figure 6:
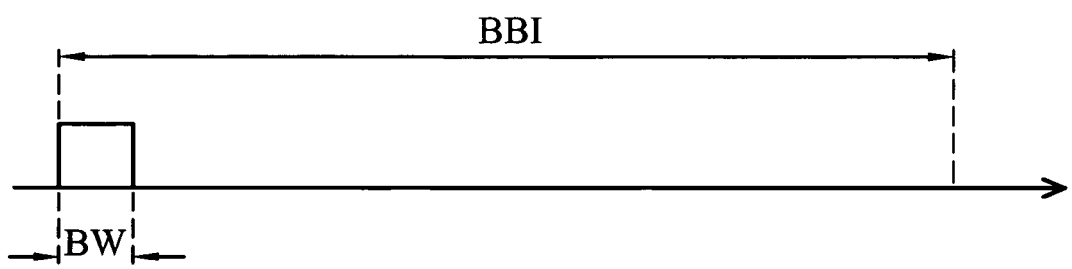
FIG. 6 is a schematic diagram illustrating an embodiment of a BBI.
Figure 7:
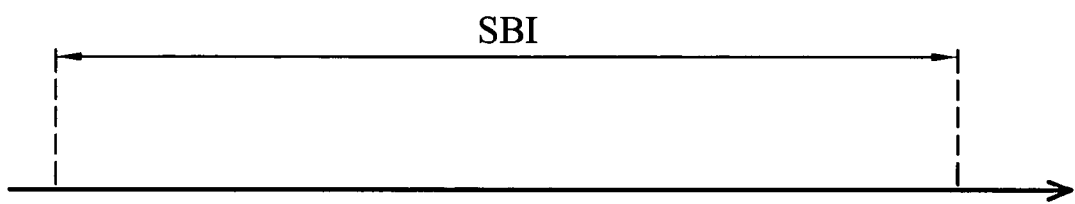
FIG. 7 is a schematic diagram illustrating an embodiment of a SBI.

FIG. 5 is a schematic diagram illustrating an embodiment of a NBI. As shown in FIG. 5, the NBI includes a AW comprising a BW (Beacon Window). It is understood that the BW must be less than the AW. Stations can transmit data in the NBI. Specifically, stations can transmit and receive beacon frames within the BW. Stations can transmit and receive ATIM frames within the AW except during the interval of the BW. If a station receives an ATIM frame within the AW, the station must return an ATIM ACK to a station transmitting the ATIM frame. If a station receives an ATIM frame within the AW, the station remains awake after the AW ends to await reception of data frames, and returns a data ACK if a data frame is received. FIG. 6 is a schematic diagram illustrating an embodiment of a BBI. As shown in FIG. 6, the BBI includes a BW. Similarly, stations can transmit and receive beacon frames within the BW. Stations enter the doze state within the BBI except during the interval of the BW. In some embodiments, no matter whether a beacon frame from other stations is received, each station must transmit its own beacon frames to other stations in its own BWs. FIG. 7 is a schematic diagram illustrating an embodiment of a SBI. Stations enter the doze state in the SBI.

It is understood that each station can set a LI (Listen Interval) value, and enters the NBI every certain number of BIs, where the certain number is LI. Further, the beacon frame transmitted within the BW comprises the LI value and a RBI (the remaining number of BIs). The RBI is the remaining number of BIs within a LI, that is, the remaining number of BIs between the BBI where the beacon frame is transmitted and the NBI.

Figure 8:
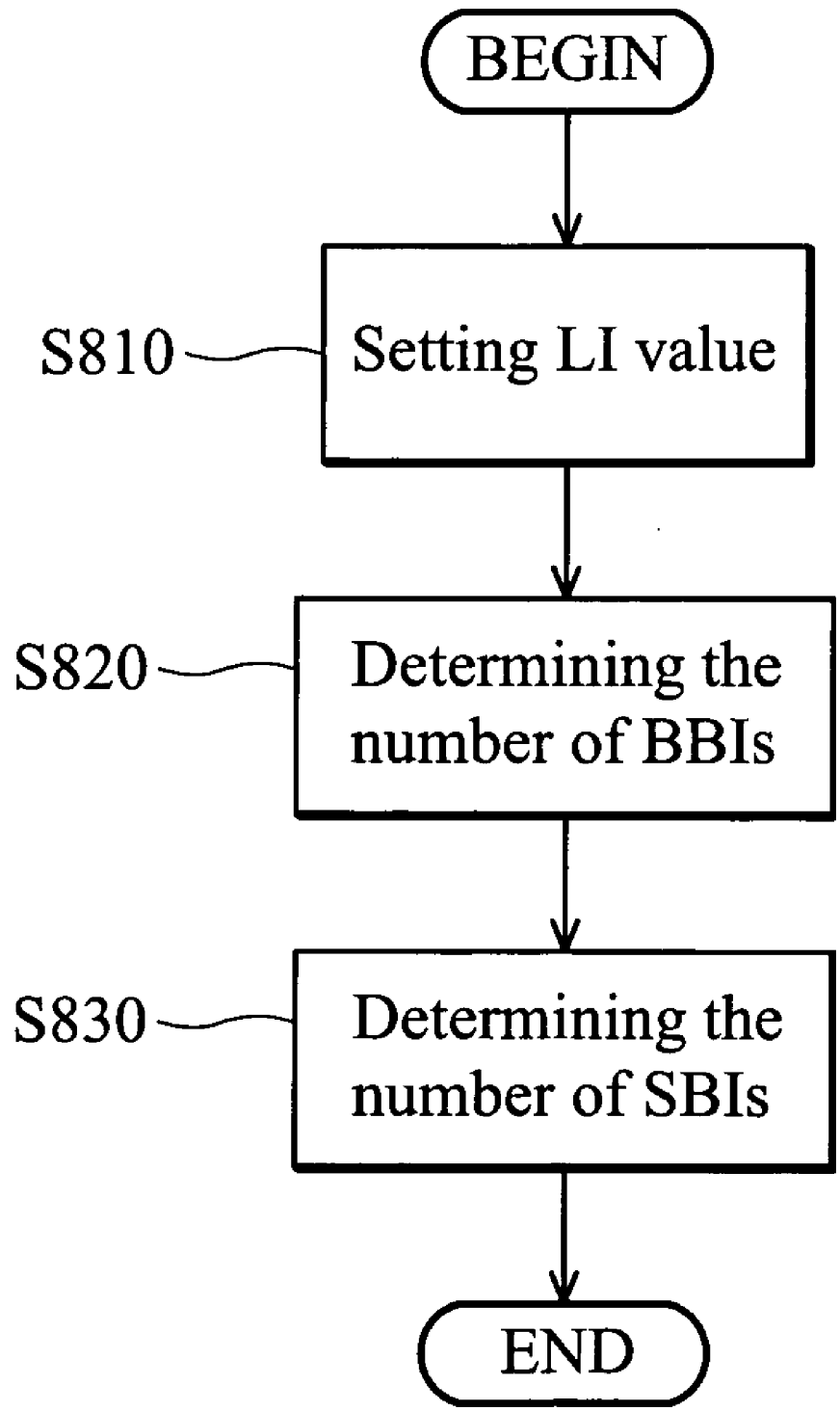
FIG. 8 is a flowchart showing an embodiment of an initial setting method, for stations.
Figure 9:
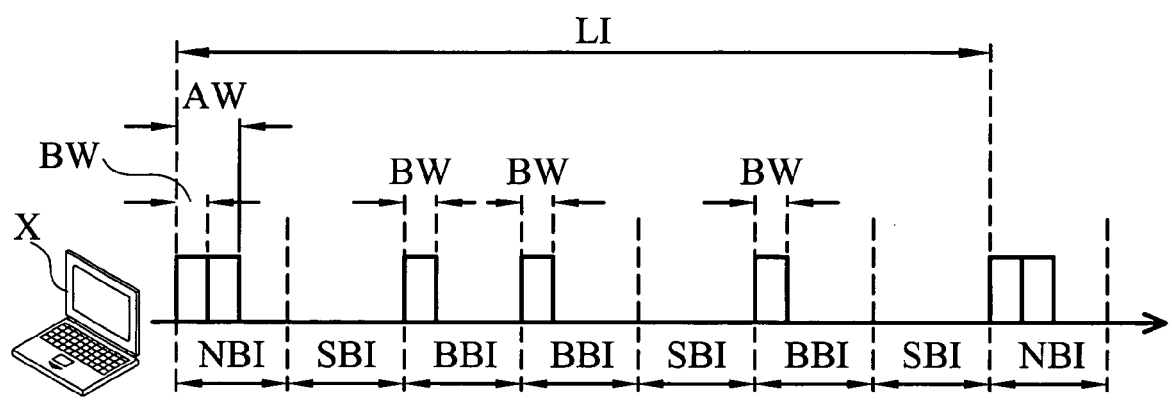
FIG. 9 is a schematic diagram illustrating an embodiment of an example of initial setting for a station.

FIG. 8 is a flowchart showing an embodiment of an initial setting method for stations. In step S810, the LI value is set, and in steps S820 and S830, the numbers of BBIs and SBIs within the LI are set. If the LI value is n, the number of BBIs in the LI is k−1, and the number of SBIs in the LI is n−k, in which k<=n. It is noted that since the first BI in the LI is a NBI, the total number of BBIs and SBIs is the LI value minus 1. FIG. 9 is a schematic diagram illustrating an embodiment of an example of initial setting for a station. In the example of FIG. 9, the LI value of station X is 7, that is, station X enters a NBI every 7 BIs. Station X can transmit data in the NBI. In this example, the number of BBIs is 3, and the number of SBIs is 3. Therefore, 4 BWs comprising the BW in the NBI are in the LI, and station X can transmit and receive beacon frames within the BWs. It is understood that the position of respective BBIs and SBIs can be arbitrarily determined.

Figure 10:
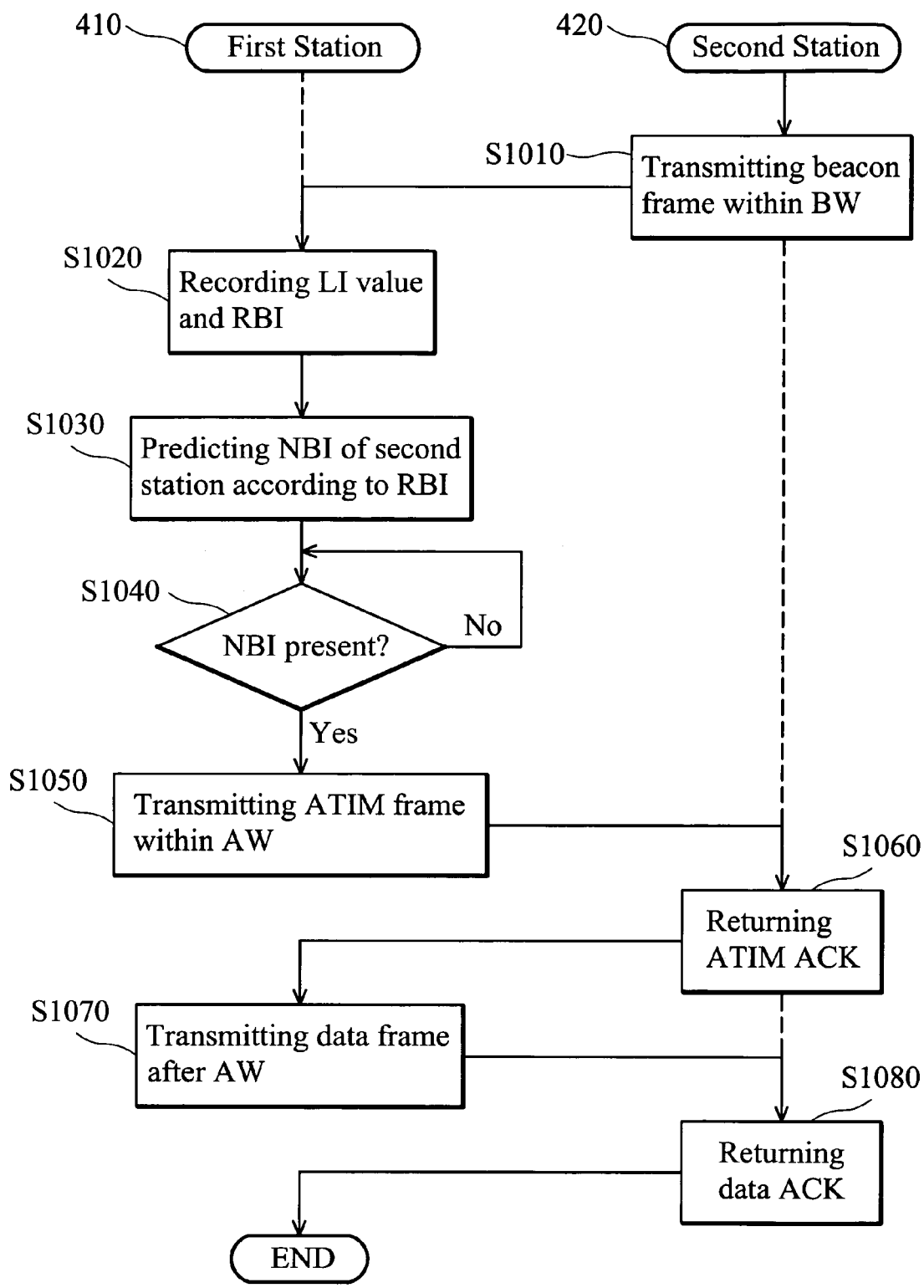
FIG. 10 is a flowchart showing an embodiment of a data transmission method.

FIG. 10 is a flowchart showing an embodiment of a data transmission method. It is understood that the station 420 transmits beacon frames to the first station 410, and the first station 410 transmits data frames to the second station 420. At the same time, the first station 410 can transmit beacon frames to the second station 420, the related details of which are omitted here.

In step S1010, the second station 420 transmits beacon frames to the first station 410 within the BWs of the NBI and BBIs. It is understood that, in some embodiments, the second station 420 can transmit beacon frames to the first station 410 within at least one BW or every BWs. Each beacon frame comprises the LI value and the RBI. After the first station 410 receives a beacon frame from the second station 420, in step S1020, the LI value and the RBI is stored in a storage device (not shown) such as a cache. In step S1030, the first station 410 predicts the NBI of the second station 420 according to the RBI. In step S1040, it is determined whether the NBI of the second station 420 is present. If not, the procedure remains at step S1040. If so, in step S1050, the first station 410 transmits an ATIM frame to the second station 420 within the AW of the NBI of the second station 420. After the second station 420 receives the ATIM frame from the first station 410, in step S1060, the second station 420 returns an ATIM ACK to the first station 410. It is understood that if the second station 420 received the ATIM frame within the AW, the second station 420 remains awake after the AW ends for awaiting reception of data frames from the first station 410. After the AW ends, in step S1070, the first station 410 transmits a data frame to the second station 420. After the second station 420 receives the data frame, in step S1080, the second station 420 returns a data ACK to the first station 410.

Figure 11:
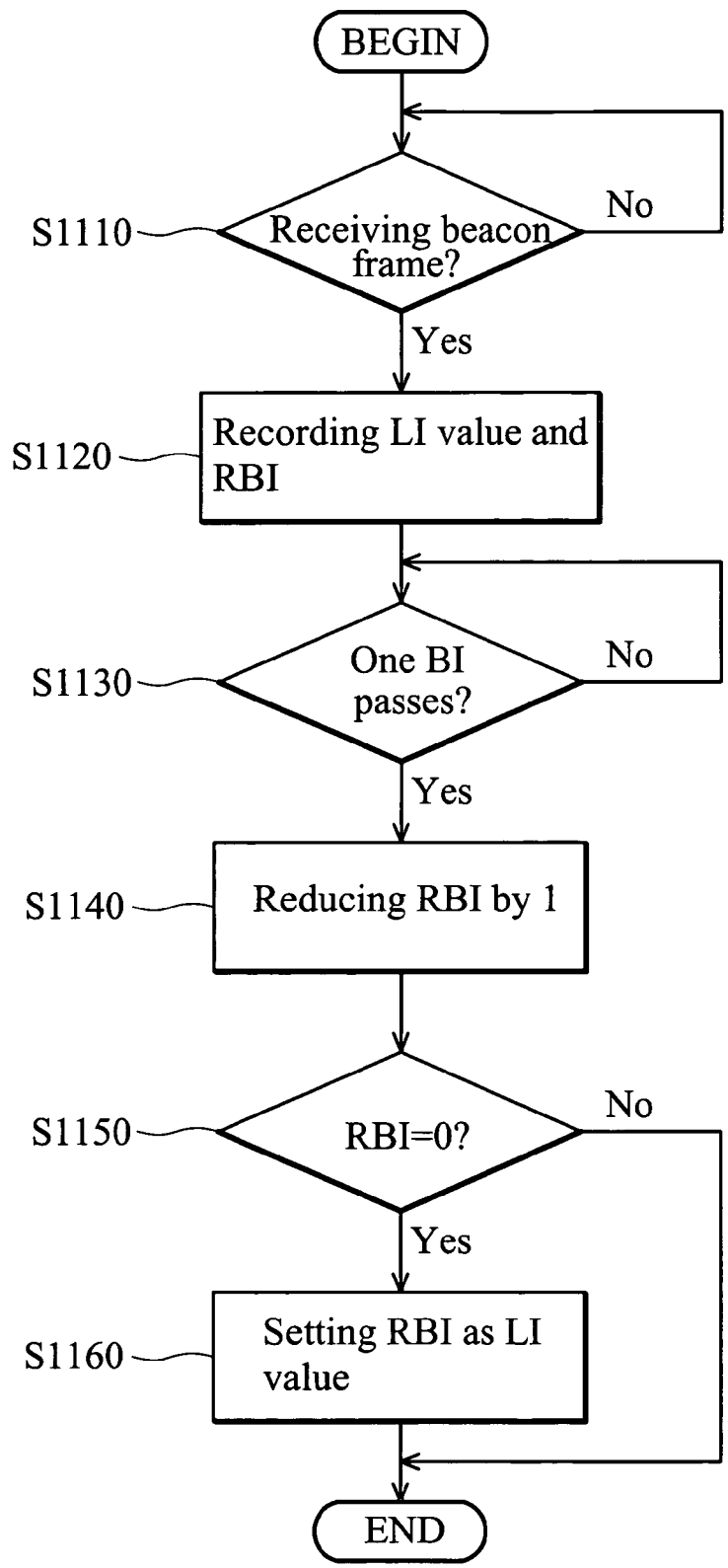
FIG. 11 is a flowchart showing an embodiment of a method for beacon frame maintenance.

FIG. 11 is a flowchart showing an embodiment of a method for beacon frame maintenance. In step S1110, it is determined whether a beacon frame is received from a station. If not, the procedure remains at step S1110. If so, in step S1120, the LI value and the RBI in the beacon frame are recorded. In step S1130, it is determined whether a BI passes. If not, the procedure remains in step S1130. If so, in step S1140, the RBI is reduced by 1, and in step S1150, it is determined whether the RBI equals 0. If not, the procedure is complete. If so, in step S1160, the RBI is set as the LI value.

Figure 12:
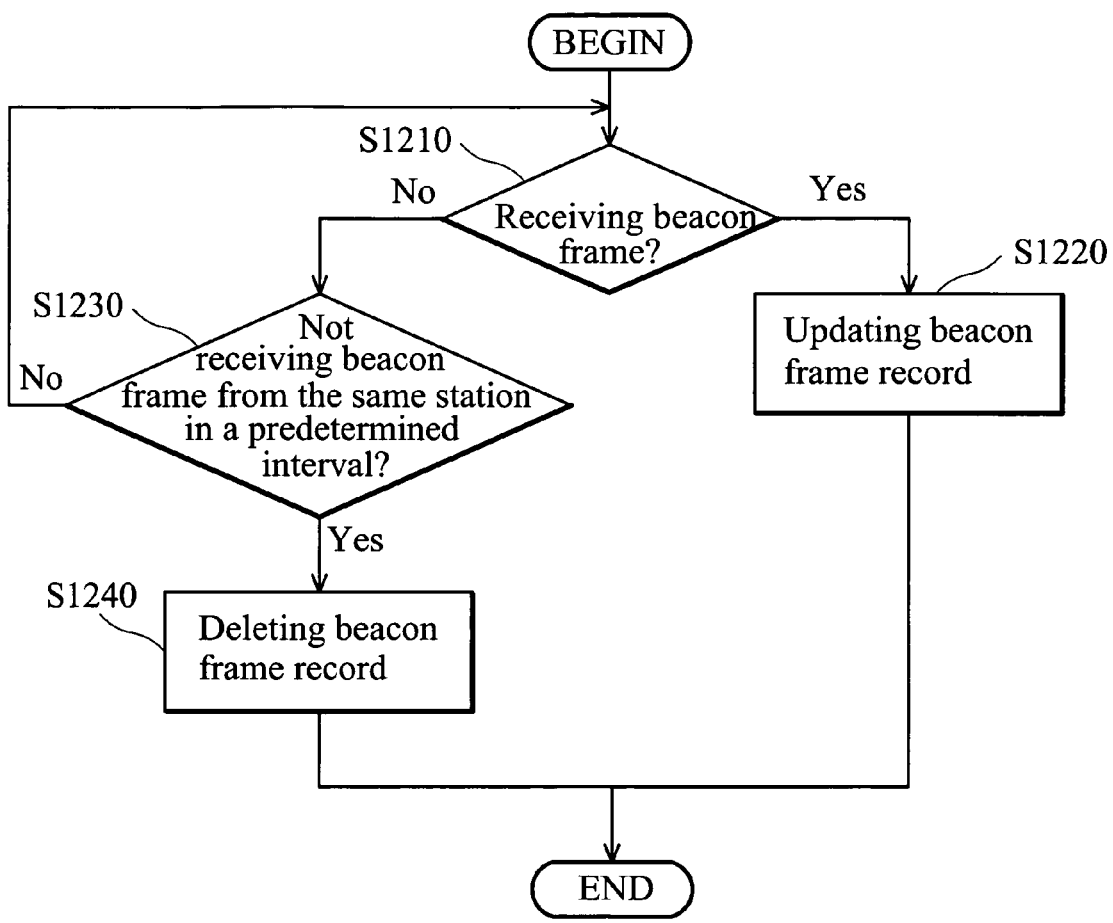
FIG. 12 is a flowchart showing another embodiment of a method for beacon frame maintenance.

FIG. 12 is a flowchart showing another embodiment of a method for beacon frame maintenance. In step S1210, it is determined whether a beacon frame is received from a station. If so, in step S1220, the LI value and the RBI corresponding to the station are updated. If not, in step S1230, it is determined whether beacon frames transmitted from the same station are received in a predetermined interval. If the time difference between two beacon frames does not exceed the predetermined interval, the procedure returns to step S1210. If no new beacon frame corresponding to the same station is received, in step S1240, the LI value and the RBI corresponding to the station are deleted.

Power management methods and systems, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power management method for use in a first station and a second station in an ad hoc wireless local area network, the method comprising:

the second station entering a NBI (Normal Beacon Interval) every certain number of BIs (Beacon Intervals), called an LI (Listen interval), for power saving and data receptions, wherein the LI comprises one NBI, some SBI (Sleep Beacon Intervals) and some BBIs (Beacon-Window-Only Beacon Intervals), wherein the NBI comprises an AW (ATIM Window) comprising a BW (Beacon Window), where the second station transmits and the first station receives beacon frames within the BW, the first station transmits and the second station receives ATIM frames within the AW, the second station returns an ATIM ACK (acknowledgement) to the first station that transmitted the ATIM frame and the second station remains awake after the AW ends to wait for the reception of data frames when having received the ATIM frame within the AW, and the first station returns a data ACK if a data frame is received, and each of the BBIs comprises the BW, where the second station broadcasts its beacon frame within the BW of the BBIs, and enters a doze state after the end of the BW in the BBI, and remains the doze state during the whole SBI, wherein the second station is disable from receiving and transmitting frames in the doze state, determining a number and the positions of the BBIs within the LI, wherein the number of the BBIs in the LI is no more than the half of the total number of BIs in the LI, and the positions of those respective BBIs are randomly selected, and the second station broadcasts a beacon frame within the BW of the BBIs, and enters the doze state in the BBI, wherein the second station is disabled from receiving and transmitting frames in the doze state, and the beacon frame comprises a RBI (Remaining number of BIs) representing the remaining number of BIs between the BBI where the beacon frame is transmitted and the NBI;

the first station receiving the beacon frame from the second station via the ad hoc wireless local area network, recording the RBI corresponding to the second station, predicting the NBI of the second station according to the RBI, and transmitting a data frame to the second station at the NBI of the second station via the ad hoc wireless local area network;

the second station transmitting the beacon frame comprising the LI value to the first station;

the first station reducing the RBI by 1 when one of the BI passes; and setting the RBI as the LI value when the RBI equals 0.

2. The method of claim 1 further comprising the first station deleting the RBI corresponding to the beacon frame if no other beacon frame is received from the second station.

3. The method of claim 1 further comprising determining the number of SBIs (Sleep Beacon Intervals), in which the second station enters a doze state in the SBIs.

4. The method of claim 3 wherein the number of the BBIs and the SBIs equals the LI value minus 1.

5. A power management system for use in an ad hoc wireless local area network, comprising:

a second station entering a NBI (Normal Beacon Interval) every certain number of BIs (Beacon Intervals) for power saving and data receptions, where an LI (Listen Interval) consists of the certain number of BIs, wherein the NBI comprises a AW (ATIM Window) comprising a BW (Beacon Window), where the second station transmits and the first station receives beacon frames within the BW, the first station transmits and the second station receives ATIM frames within the AW, the second station returns an ATIM ACK (acknowledgement) to the first station transmitting the ATIM frame and the second station remains awake after the AW ends to wait for the-reception of data frames when having received the ATIM frame within the AW, and the first station returns a data ACK if a data frame is received, the second station determining a number and the positions of BBIs (Beacon-Window-Only Beacon Intervals) within the LI, the second station broadcasting a beacon frame within the BBIs, in which the number of BBIs in the LI is no more than the half of the total number of BIs in the LI, and the positions of those respective BBIs are randomly selected, and the second station transmits the beacon frame within the BW, and enters the doze state in the BBI except during the interval of the BW, and remains the doze state during the whole SBI, wherein the second station is disabled from receiving and transmitting frames in the doze state, and the beacon frame comprises a RBI(Remaining number of BIs) representing the remaining number of BIs between the BBI where the beacon frame is transmitted and the NBI; and a first station receiving the beacon frame from the second station via the ad hoc wireless local area network, recording the RBI corresponding to the second station, predicting the NBI of the second station according to the RBI, and transmitting a data frame to the second station at the NBI of the second station via the ad hoc wireless local area network, wherein the second station further transmits the beacon frame comprising the LI value to the first station, the first station reduces the RBI by 1 when one of the BI passes, and the RBI is set as the LI value when the RBI equals 0.

6. The system of claim 5 wherein the first station further deletes the RBI corresponding to the beacon frame if no other beacon frame is received from the second station.

7. The system of claim 5 wherein the second station further determines the number of SBIs (Sleep Beacon Intervals), in which the second station enters a doze state in the SBIs.

8. The system of claim 7 wherein the number of the BBIs and the SBIs equals the LI value minus 1.

9. A power management method for use in a second station in an ad hoc wireless local area network, the method comprising:

the second station entering a NBI (Normal Beacon Interval) every certain number of BIs (Beacon Intervals) for power saving and data receptions, a LI (Listen Interval) comprising one NBI, some SBI (Sleep Beacon Intervals) and some BBIs (Beacon-Window-Only Beacon Intervals), wherein the NBI comprises an AW (ATIM Window) comprising a BW (Beacon Window), where the second station transmits and the first station receives beacon frames within the BW, the first station transmits and the second station receives ATIM frames within the AW, the second station returns an ATIM ACK (acknowledgement) to the first station transmitting the ATIM frame and the second station remains awake after the AW ends to wait for the reception of data frames when have received the ATIM frame within the AW, and the first station returns a data ACK if a data frame is received, and each of the BBIs comprises the BW, where the second station broadcasts its beacon frame within the BW of the BBIs, and enters a doze state after the end of BW in the BBI, and remains the doze state during the whole SBI, wherein the second station is disable from receiving and transmitting frames in the doze state, determining a number and the positions of the BBIs (Beacon-Window-Only Beacon Intervals) within the LI, wherein the number of BBIs in the LI is no more than the half of the total number of BIs in the LI, and the positions of those respective BBIs are randomly selected, and the second station broadcasts a beacon frame within the BW of the BBIs, and enters the doze state after the end of BW in the BBI, wherein the second station is disabled from receiving and transmitting frames in the doze state, and the beacon frame comprises a RBI (Remaining number of BIs) representing the remaining number of BIs between the BBI where the beacon frame is transmitted and the NBI;

a first station receiving the beacon frame from the second station via the ad hoc wireless local area network, recording the RBI corresponding to the second station, predicting the NBI of the second station according to the RBI, and transmitting a data frame to the second station at the NBI of the second station via the ad hoc wireless local area network;

the second station transmitting the beacon frame comprising the LI value to the first station;

the first station reducing the RBI by 1 when one of the BI passes; and setting the RBI as the LI value when the RBI equals 0.

10. The method of claim 9 further comprising:

the first station receiving the beacon frame from the second station;

predicting the NBI of the second station according to the RBI; and transmitting the data frame to the second station at the NBI of the second station.

11. The method of claim 9 further comprising determining the number of SBIs (Sleep Beacon Intervals), in which the second station enters a doze state in the SBIs.

12. The method of claim 11 wherein the number of the BBIs and the SBIs equals the LI value minus 1.

* * * * *